US006467114B1

(12) United States Patent
Sigl

(10) Patent No.: US 6,467,114 B1
(45) Date of Patent: Oct. 22, 2002

(54) MULTIFUNCTIONAL LIFE-SAVING DEVICE

(75) Inventor: Kurt Sigl, Ingolstadt (DE)

(73) Assignee: I.R.S. Insassen-Reuttengssysteme GmbH, Kosching (DE)

( * ) Notice: Subject to any disclaimer, the term of this patent is extended or adjusted under 35 U.S.C. 154(b) by 0 days.

(21) Appl. No.: 09/509,479

(22) PCT Filed: Mar. 18, 1999

(86) PCT No.: PCT/EP98/01593

§ 371 (c)(1),
(2), (4) Date: Jun. 16, 2000

(87) PCT Pub. No.: WO99/16587

PCT Pub. Date: Apr. 8, 1999

(30) Foreign Application Priority Data

Sep. 26, 1997 (DE) ...................................... 297 17 194 U

(51) Int. Cl.[7] .................................................. B25D 1/04
(52) U.S. Cl. ................................................. 7/144; 7/158
(58) Field of Search ............................. 7/143, 144, 158

(56) References Cited

U.S. PATENT DOCUMENTS 83,499 A * 10/1868 Holtzscheiter ................ 7/144
4,985,954 A * 1/1991 Wehr ............................... 7/144
5,421,460 A 6/1995 Bosshard
5,630,242 A 5/1997 Oginaezawa
5,903,942 A * 5/1999 Hasegawa ...................... 7/144

FOREIGN PATENT DOCUMENTS

DE          23 64 372     * 7/1975 ..................... 7/144
DE          GM8412077       8/1984
DE          3530363 A1      1/1985

OTHER PUBLICATIONS

European Patent Office Examination Report, PCT/EP 98/01593, Nov. 24, 1999, pp 21–29 in English.
"Rescue Rod as Keyring Pendant", Krafthand, vol. 20, Oct. 21, 1995, Germany, p. 1410 with translation.

* cited by examiner

Primary Examiner—Eileen P. Morgan
Assistant Examiner—Joni B. Danganan
(74) Attorney, Agent, or Firm—Dority & Manning, PA

(57) ABSTRACT

A multi-functional lifesaving apparatus is provided in which a cylindrical tool has a main body portion and a cap portion, the cap portion defining a hollow enclosure. The enclosure is adapted for securing to the main body portion of the main body tool. A blade extends from one terminus of the main body portion and has a curved cutting blade adapted for cutting safety belts. A capped terminus defines a terminal point used to strike and break a glass window or screen.

18 Claims, 2 Drawing Sheets

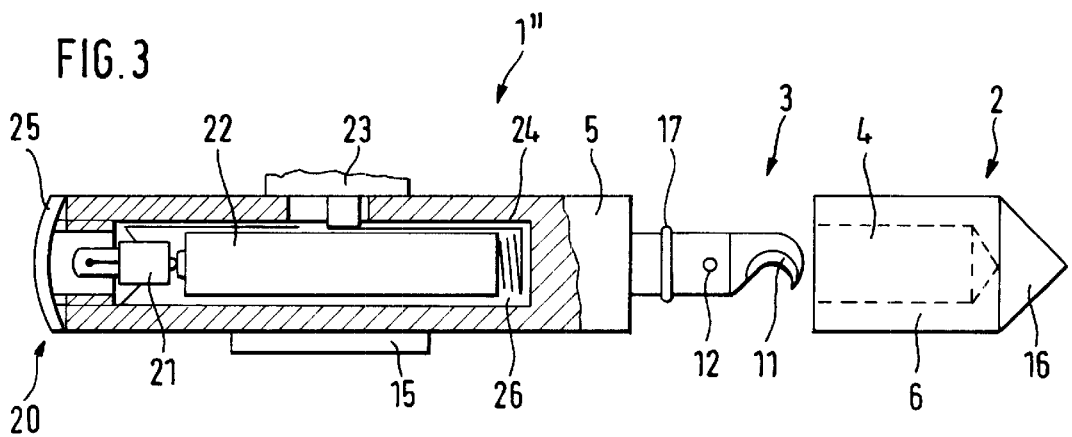
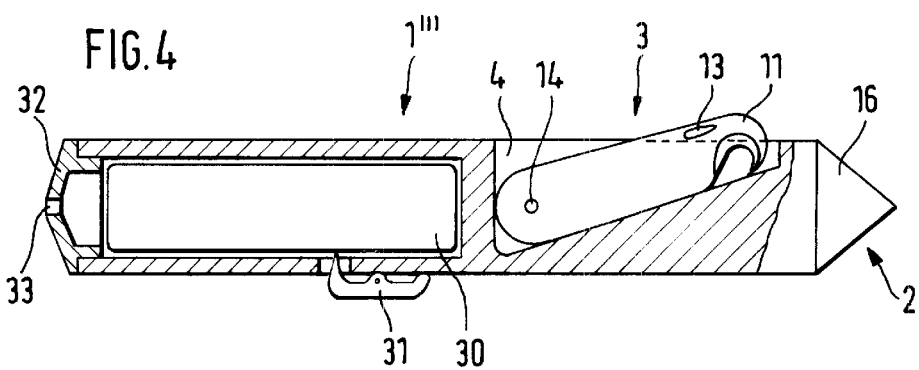
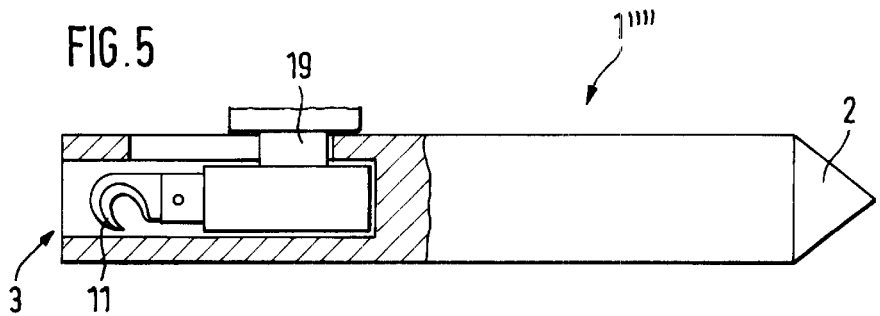

MULTIFUNCTIONAL LIFE-SAVING DEVICE

The invention is relative to a multifunctional lifesaving device in particular for freeing passengers locked and/or strapped in a vehicle which device comprises a striking part, for example for shattering the windowpanes and comprises a cutting device for cutting the safety belts.

DE 3530 363 A 1 teaches a lifesaving device comprising a striking part for striking the pane and a cutting device for cutting the belt. The cutting device is formed by a knife inserted in a slot of the housing with a handle-shaped grip, which slot tapers to the rear. A portion of the housing is widened out like a fist on one end of the handle-shaped housing. The fist-shaped housing part of the slot receiving the knife is located on the one side of the housing and on the opposite side a striking part is attached. This lifesaving device can be used like a customary hammer during which the belt to be separated is placed in the insertion slot extending to the knife and is separated there. Such a design has the disadvantage that the knife is arranged on the lifesaving device in an unsecured fashion. Thus, it is to be feared that when the lifesaving device is being transported objects will make inadvertent contact with the knife and damage it or in some instances even injure the person carrying the lifesaving device. Another disadvantage is the fact that the hammer must be designed to be rather large in its dimensions due to its hammer-like shape. This makes it so large that the user cannot always take the lifesaving device along with himself. Thus, it can happen that just when the person needs the lifesaving device it is not in the vicinity of the person to be rescued.

DE-GM 84 12 077 discloses a lifesaving device comprising a shaft-like housing whose upper end is provided with a striking part. A knife for cutting the belt is arranged in an attachment running back at an acute angle and forming a slot. The other end comprises a loop-shaped grip provided for operating the knife when cutting the belt. There is also the danger with this device, just as with the previously described lifesaving device, that objects are introduced inadvertently into the slot and damaged by the knife since the knife is arranged in an unprotected manner on the lifesaving device.

The present invention therefore has the problem of creating a multifunctional lifesaving device with which at least one striking device and one cutting device are available as needed which cutting device is arranged in the lifesaving device in a protected manner.

The invention has the further problem of creating a lifesaving device combining several functions in a very small space so that people can readily carry it at any anytime without the danger that the person or other objects carried by the person are damaged by the lifesaving device.

The problem is solved by the features of the present invention.

If the striking piece is arranged on one end of the lifesaving device the rest of the device advantageously functions as a grasping part with which the striking part can being used as needed. According to the invention the cutting device is located in a hollow chamber of the lifesaving device from which it can be removed prior to being used. In this manner the cutting device is reliably stored when not being used without any danger of injury by the cutting device. The danger of injury is very large because the cutting device, which is meant to be used, for example, for cutting safety belts in a vehicle, is very sharp. If the cutting device were to be arranged openly on the lifesaving device there would be a danger of injury to the person with a lifesaving device with such a sharp cutting device. They would also be the danger that the cutting device would destroy other objects located in the vicinity of the lifesaving device. The hollow chamber of the lifesaving device can be designed as a slot into which the cutting device can be lowered. A design is also possible in which the hollow chamber is inserted or screwed like a cap or a casing over the cutting device as a result of which the cutting device is reliably protected from making contact with other objects. When needed, the cap or casing is removed from the cutting device or the cutting device is folded out from or drawn out of the slot-shaped hollow chamber of the lifesaving device.

If the lifesaving device is designed essentially like a shank it does not take up much space and can therefore be readily taken along by people. In addition, the shank-like design of the lifesaving device makes it possible for it to be readily used for shattering windowpanes and cutting safety belts since it fits well in the hand and offers a good grip.

The lifesaving device is advantageously designed in at least two parts. This brings it about in an especially simple embodiment of the invention that the protection of the cutting device is achieved in that a cap or casing is inserted over the cutting device when it is not needed, which cap or casing can be removed simply and rapidly as needed from the cutting device. It is advantageous if the two parts are screwed together so that no inadvertent separation of the two parts occurs, thus creating the possibility of injury.

If the two parts are inserted into one another this also creates a reliable protection of the cutting device by means of an appropriate clamping connection and on the other hand assures a very rapid removal of the protective device from the cutting device in case of need.

In such two-part embodiments the cutting device is arranged with advantage on the first part. The second part comprises the hollow chamber that receives the cutting device when it is not needed.

In an advantageous embodiment the cutting device is connected in a pivotable or movable manner to the lifesaving device. The cutting device is lowered into the hollow chamber of the lifesaving device by a pivoting movement or a sliding movement, which stores it in a protected manner.

A cutting device has proven to be advantageous which comprises a hook-shaped knife. A hook-shaped knife assures that the belt can be automatically threaded into the knife, thus making it possible for the belt to be reliably and rapidly separated.

An advantageous embodiment of the invention provides that the cutting device is arranged on the first part and the striking part on the second part. This makes it possible for different materials to be able to be used in the lifesaving device. Thus, it is particularly advantageous if at least one of the parts of the lifesaving device, in particular the striking part, is made of steel. This large mass of the lifesaving device makes it possible to break through a windowpane in a reliable manner in case of rescue. Another part of the lifesaving device can be manufactured, e.g., from aluminum, which makes it possible to carry the lifesaving device, as its total weight is not too heavy.

In order to always have the lifesaving device ready to be used it is advantageous if it is provided with a magnet, which makes it possible for it to be fastened to a piece of metal, in particular in a vehicle. Another possibility of fastening is that the lifesaving device comprises a through bore running transversally to the longitudinal axis, with which the lifesaving device can be fastened, e.g., to a key chain. As a result of the compact and small design of the lifesaving device made possible by storing the cutting device in the hollow chamber of the lifesaving device it has proven to be especially advantageous if the lifesaving device is designed as a keyring pendant.

In order to reliably shatter the windowpane of the vehicle it is advantageous if the striking piece has a sharp-edged or pointed, essentially conical end. It is possible to shatter the windowpane with this edge or point even with little expenditure of force. This makes it possible in an advantageous manner to shatter the windowpane without any danger of injuring the person using the lifesaving device.

In order to keep the hand guiding the lifesaving device from slipping, it is advantageous if the parts of the lifesaving device comprise grippable surfaces such as, e.g., patterns, grooves or crosspieces or an edging with the same effect. This assures on one hand that the lifesaving device can be reliably held and guided in the hand when shattering the windowpane and cutting the belt and on the other hand it is also advantageous that the lifesaving device can be rapidly disassembled and the cutting device exposed as a result of the appropriate, grippable surface.

In order to be able to use the lifesaving device in an even more versatile manner and to create an inducement for the user to constantly keep the lifesaving device at his side a light can be additionally provided in the lifesaving device. It proved to be especially advantageous if this light is located in the end of the lifesaving device facing away from the striking part. This makes it possible for the striking-part side and the light side to be designed independently of one another. The lifesaving device itself can be designed in such a manner that it advantageously comprises an opening for receiving a battery in the one part of the lifesaving device which battery is provided for operating the light. This part can furthermore comprise a switch with which the light is put in operation. The switch can either be designed as a slider switch or also by rotating the parts, given a multipartite design of the lifesaving device.

The lifesaving device can also receive a self-protection device. To this end a gas cartridge with a release mechanism is arranged in a hollow chamber of the lifesaving device. An exit opening is advantageously provided in one of the parts through which opening a gas released from the gas cartridge can escape. Such a self-protection device can be used with advantage for defense against attackers, who are driven off by the use of the gas.

The lifesaving device can also comprise an electroshock device as self-protection device which when triggered repels an attacker by means of electroshock.

The multifunctional lifesaving device in accordance with the invention thus exhibits great versatility of use. It is not limited to the exemplary embodiments described in the following. Thus, the invention can absolutely also be provided in a different design, e.g., in a square design or with surfaces provided with grip strips.

Further advantages of the invention are presented in the following exemplary embodiments.

FIG. 3 shows the lifesaving device in accordance with the invention with a light.

FIG. 4 shows a lifesaving device in accordance with the invention with a self-protection device.

FIG. 5 shows a lifesaving device in accordance with the invention with a movable cutting device.

Figure 1:
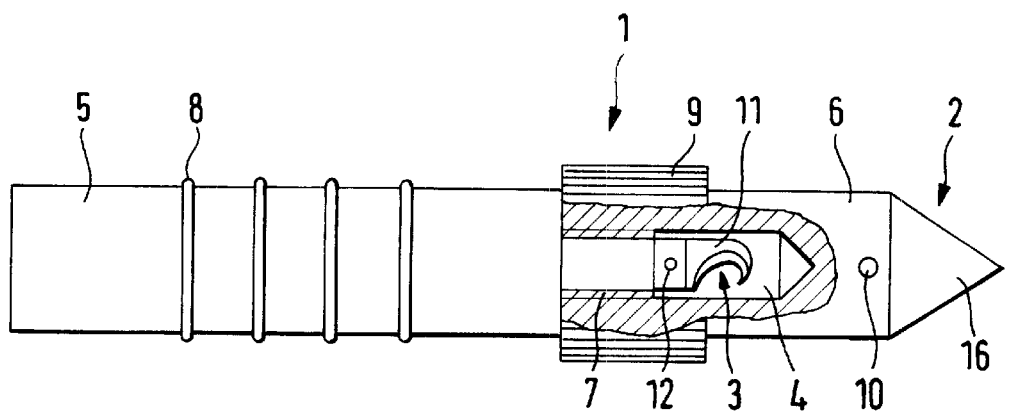
FIG. 1 shows a two-part lifesaving device in accordance with the invention with a cap.

FIG. 1 shows lifesaving device 1 in accordance with the invention consisting of a first part 5 and a second part 6. Cutting device 3 is arranged in first part 5. Cutting device 3 is arranged in a protected manner in hollow chamber 4 of second part 6. This reliably prevents any injury or damage due to cutting device 3. Second part 6 comprises striking part 2 that has conical end 16 on one end. Conical end 16 is used to reliably destroy a windowpane when it is used. Bore 10 is provided in second part 6 through which bore a key chain ring can be inserted. This makes it possible to reliably store lifesaving device 1. It also ensures that lifesaving device is always at hand in case of need if lifesaving device is fastened to the automobile key chain by means of bore 10.

First part 5 and second part 6 are connected to one another by thread 7. Cutting device 3 can be rapidly exposed by rotating first part 5 and second part 6 in opposite directions. In order to obtain a grippable surface of first part 5 and second part 6 a plurality of crosspieces 8 is arranged on first part 5. These crosspieces 8 bring it about that the hand guiding lifesaving device 1 does not slip off lifesaving device 1 during a striking motion. Edging 9 on second part 6 is designed in such a manner that a reliable rotation of first part 5 and second part 6 in opposite directions can take place without the hand or the fingers slipping off.

Cutting device 3 is arranged on first part 5. In the present instance cutting device 3 consists of knife 11 with a hook-shaped plate. Knife 11 is connected to first part 5 by pin 12. Hollow chamber 4 in second part 6 is designed in such a manner that it can receive knife 11 in its entirety. Pin 12 assures that knife 11 is not torn out of first part 5 during a cutting motion with which the belt is caught and cut in the hook-shaped blade of knife 11.

Crosspieces 8 can either be formed out of the material of first part 5 or can also be rubber rings which are slipped over first part 5 and held in small grooves of first part 5.

It proved to be advantageous if first part 5 is manufactured out of aluminum and second part 6 out of steel. This assures a good compromise between the weight of lifesaving device 1, which should not be too great, and on the other hand a powerful mass and resistive force of striking part 2 when shattering a windowpane.

Bore 10 for fastening to a key chain can also be located in first part 5. This assures that the key chain hanging on lifesaving device 1 does not hinder a shattering of a windowpane. However, tests have shown that even a key chain located in the vicinity of conical tip 16 of striking piece 2 permits a shattering of a windowpane. As a result of the conical design of striking piece 2 customary vehicle windowpanes can be shattered with only a very slight application of force.

Figure 2:
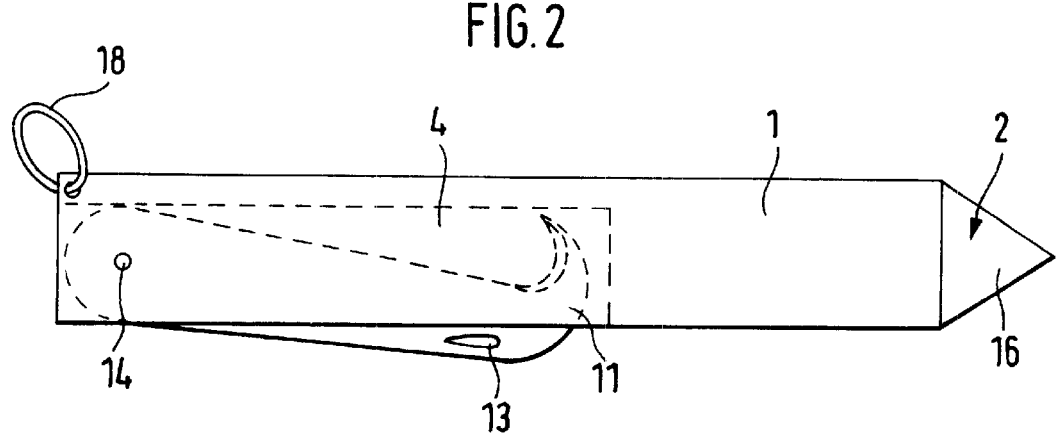
FIG. 2 shows a lifesaving device in accordance with the invention with a foldable cutting device.

In FIG. 2 striking part 2 is integrated in lifesaving device 1' at one end. Striking piece 2 consists essentially of conical end 16 with a sharp tip for shattering a windowpane. The lifesaving device comprises hollow chamber 4' into which knife 11 is partially lowered. In this exemplary embodiment hollow chamber 4 is designed as a longitudinal slot in lifesaving device 1'. Knife 11 can pivot about axis of a pivot pin 14. In the position of knife 11 shown it is in the protected position. After having been rotated about pin 14 knife 11 is folded out in an axial extension of lifesaving device 1'. In order to be able to move knife 11 out of the position shown into the folded-out position, grip notch 13 is provided on the blade of knife 11. Knife 11 can be grasped at this grip notch 13 and moved out of hollow chamber 4'.

In the folded-in state the bent blade of knife 11 is advantageously directed toward the bottom of hollow chamber 4'. This assures additional protection against being injured.

Ring 18 is provided to make lifesaving device 1' easier to carry. Ring 18 is located on one end, preferably on the end opposite striking part 2. Lifesaving device 1' can be fastened by ring 18 to a key chain or a chain or can be suspended from a hook in the vehicle so that is available at all times.

Knife 11 can be secured by a spring (not shown) so that it does not inadvertently slip out of hollow chamber 4'. Moreover, a spring can also be used to position knife 11 in a stable manner in the folded-out position.

FIG. 3 shows a lifesaving device 1" in accordance with the invention with integrated light 20. Light 20 is located in first part 5 of lifesaving device 1". First part 5 functions at the same time as a grip for striking part 2.

Light 20 comprises lamp 21, preferably a halogen lamp, and battery 22. Lamp 21 and battery 22 are located in hollow chamber 26. In addition, contact lead 24 is housed in hollow chamber 26 which lead supplies current to lamp 21. The current supply can be interrupted by switch 23. Lamp 21 and battery 22 are pressed against one another in the present exemplary embodiment by glass cover 25. To this end glass cover 25 is screwed into first part 5. In addition, first part 5 comprises magnet 15. Lifesaving device 1" can be arranged on a metallic body with magnet 15. This is very advantageous in particular for positioning it in a vehicle.

Second part 6" of lifesaving device 1" functions at the same time as a cap for cutting device 3 and as striking part 2. Hollow chamber 4" is arranged in second part 6" which chamber is inserted over cutting device 3. Cutting device 3 is covered in such a manner by second part 6" in the present exemplary embodiment that second part 6 is thrust solely over rubber ring 17. This achieves a sufficiently firm seat with a connection of first part 5 and second part 6". This embodiment has the advantage that the two parts can be separated very rapidly from one another so that cutting device 3 can be used very rapidly.

Knife 11 of cutting device 3 is again bent so that the cutting of the belt can be reliably guided. In order to prevent knife 11 from coming loose from first part 5 knife 11 is secured on first part 5 by pin 12.

FIG. 4 shows lifesaving device 1''' in accordance with the invention which device comprises a self-protection device. The self-protection device consists of gas cartridge 30 and release device 31 shown only in schematic fashion. Gas cartridge 30 is located in a hollow chamber of lifesaving device 1 and secured there by cover 32. Cover 32 comprises exit opening 33 from which gas escapes as needed and after the release of gas cartridge 30. Such a lifesaving device 1''' can be very advantageous in case of an attack and repels the attackers with the exiting gas. Due to the fact that lifesaving device 1''' can be used in many ways and takes up only a little space it can be taken along by the user at all times. It is therefore available at all times in case of such an attack.

The self-protection device is arranged in the present exemplary embodiment just as in the exemplary embodiment the FIG. 3 on the end of lifesaving device 1''' facing away from striking part 2 which makes possible an independent design of striking part 2 and of the self-protection device. The self-protection device may also be provided in the form of an electro-shock device.

Cutting device 3 in the exemplary embodiment of FIG. 4 is recessed in hollow chamber 4' of lifesaving device 1'''. Cutting device 3 with its knife 11 can be pivoted out of this hollow chamber 4 via pivot pin 14 and grip notch 13. In contrast to the preceding exemplary embodiments knife 11 is then standing essentially at a right angle to the longitudinal axis of lifesaving device 1. As a result, lifesaving device 1''' can be held in the hand of the user in the form of a T-piece like a corkscrew. This achieves an even better grip of lifesaving device 1''', which means that even more force can be applied when cutting the belt.

FIG. 5 shows a lifesaving device 1'''' with striking part 2 and with cutting device 3 integrated in a hollow chamber. Cutting device 3 with knife 11 is arranged so that it can shift along the longitudinal axis of lifesaving device 1''''. Cutting device 3 is moved by slide 19, which can be actuated from the outside of lifesaving device 1''''. Cutting device 3 is moved out of the hollow chamber of lifesaving device 1 as needed by a longitudinal movement of slide 19, which brings it rapidly into a position of use. Cutting device 3 can be locked by means of notches or indentations (not shown) that are put out of operation when slide 19 is actuated, e.g., by pressing down slide 19.

The present invention is not limited to the exemplary embodiments. Variations of the exemplary embodiments and combinations of the individual designs are to be considered as falling within the scope of the invention. Aside from the invention other shapes such as round or unround cross-sections of lifesaving device 1 as well as other deviations of shape are possible. Likewise, knife 11 can have a shape different than a curved shape, e.g., an oblong shape, or it can be provided with an insertion slot. In any case, it is important thereby that a reliable and rapid cutting of the belt be achieved.

First part 5 and second part 6 can also be connected by a groove plug. To this end a pin, e.g., of first part 5, is introduced into a bent groove of second part 6 so that after parts 5,6 have been rotated the two parts 5, 6 are either locked or unlocked.

What is claimed is:

1. A multi-functional lifesaving apparatus comprising:
   a cylindrical tool having a main body portion and a cap, said cap defining a hollow enclosure therein;
   a blade secured to a first terminus of said main body portion, said blade extending along an axis defined by the main body portion;
   a rubber ring secured along an exterior of said first terminus of said main body portion, said rubber ring adapted for engaging an interior wall of said hollow enclosure, thereby reversibly securing said main body portion to said cap.

2. The apparatus according to claim 1 wherein said blade is attached to said main body portion by a pin.

3. The apparatus according to claim 2 wherein said blade pivots about said pin wherein said blade is pivotable to a position substantially perpendicular to said axis defined by the main body portion.

4. The apparatus according to claim 2 wherein said blade is stored within said tool through a slot, said slot defined in part by both said main body portion and said cap.

5. The apparatus according to claim 1 wherein a terminus of said cap defines a conical point.

6. The apparatus according to claim 5 wherein said cap further defines a bore traversing said cap.

7. The apparatus according to claim 1 wherein an exterior surface of said main body portion has attached thereto a magnet.

8. The apparatus according to claim 1 wherein said blade pivots about said main body portion from a storage position to a cutting position.

9. The apparatus according to claim 8 wherein said main body portion defines a slot for securing the blade in a stored position.

10. The apparatus according to claim 1 wherein said blade further defines a hook-shaped cutting portion.

11. The apparatus according to claim 1 wherein said main body portion further defines a chamber therein, said chamber adapted for housing and dispensing a pressurized gas.

12. A multi-functional lifesaving apparatus comprising:

a cylindrical tool having a main body portion and a cap, said cap defining a hollow enclosure therein and said cap further defining a terminal end defining a hardened point;

a blade carried by said main body portion, said blade having a storage position wherein a cutting edge is stored within said cylindrical tool and said blade having a cutting position which extends from the main body portion;

a rubber ring secured along the exterior of said main body portion, said rubber ring adapted for engaging an interior wall of said hollow enclosure, thereby securing said main body portion to said cap.

13. The apparatus according to claim 12 wherein said blade is slideably extendable from the interior of said main body portion.

14. The apparatus according to claim 12 wherein said cap defines a bore traversing a width of said cap.

15. The apparatus according to claim 12 wherein said main body portion defines therein a flashlight, said main body having a terminal end defining a glass cover, said glass cover adapted for transmitting a beam of light therethrough.

16. The apparatus according to claim 12 wherein said main body portion further defines a chamber therein, said chamber adapted for housing and dispensing a pressurized gas.

17. The apparatus according to claim 12 wherein said blade further defines a hook-shaped cutting edge.

18. The apparatus according to claim 12 wherein said main body portion further defines a chamber therein, said chamber adapted for housing an electro-shock device.

* * * * *

UNITED STATES PATENT AND TRADEMARK OFFICE
CERTIFICATE OF CORRECTION

PATENT NO. : 6,467,114 B1
DATED : October 22, 2002
INVENTOR(S) : Kurt Sigl

It is certified that error appears in the above-identified patent and that said Letters Patent is hereby corrected as shown below:

<u>Title page,</u>
Item [22], PCT filing date should be corrected to:
-- March 18, 1998 --

Signed and Sealed this

Twenty-ninth Day of July, 2003

JAMES E. ROGAN
*Director of the United States Patent and Trademark Office*